(12) United States Patent
Small et al.

(10) Patent No.: US 6,860,788 B2
(45) Date of Patent: Mar. 1, 2005

(54) METHODS AND APPARATUS FOR CHOCOLATE DISPENSERS

(75) Inventors: David Small, San Jose, CA (US); Scott David Eckerman, Campbell, CA (US); Leslie Earl Allen, III, Riverbank, CA (US)

(73) Assignee: Shoot the Moon Products II, LLC, Pleasanton, CA (US)

( * ) Notice: Subject to any disclaimer, the term of this patent is extended or adjusted under 35 U.S.C. 154(b) by 103 days.

(21) Appl. No.: 10/042,669

(22) Filed: Jan. 9, 2002

(65) Prior Publication Data

US 2003/0129921 A1 Jul. 10, 2003

(51) Int. Cl.⁷ ............................................. A63H 33/30
(52) U.S. Cl. ....................................... 446/475; 446/484
(58) Field of Search ..................... 426/383; 222/146.5, 222/327, 391, 568; 446/475, 424, 483, 267, 484

(56) References Cited

U.S. PATENT DOCUMENTS

| | | |
|---|---|---|
| 608,958 A | 8/1898 | Ferraioli |
| 679,983 A | 8/1901 | O'Neil |
| 1,649,307 A | 11/1927 | Hunter |
| 1,657,299 A | 1/1928 | Dagley |
| 2,118,154 A | 5/1938 | Buedingen |
| 2,556,609 A | 6/1951 | Arkless |
| 2,591,516 A | 4/1952 | Darnell |
| 3,154,811 A | 11/1964 | Gardener |
| 3,157,312 A | 11/1964 | Kitterman |
| 3,204,832 A | 9/1965 | Barber |
| 3,229,647 A | 1/1966 | Von Drachenfels et al. |
| 3,239,649 A | 3/1966 | Reeve |
| 3,262,404 A | 7/1966 | Morz et al. |
| 3,307,503 A | 3/1967 | Elmer, Jr. et al. |
| 3,604,597 A | 9/1971 | Pohl et al. |
| 3,847,523 A | 11/1974 | Parrish et al. |
| 3,921,858 A | 11/1975 | Bemm |
| 3,997,085 A | 12/1976 | Lindquist |
| 4,018,366 A | 4/1977 | Ficken et al. |
| 4,078,876 A | 3/1978 | Yesulis |
| 4,083,666 A | 4/1978 | Richardson |
| 4,094,446 A | 6/1978 | Brutsman |
| 4,135,644 A | 1/1979 | Pacetti |
| 4,180,187 A | 12/1979 | Ben-Haim |
| 4,191,786 A | 3/1980 | Nappen et al. |
| 4,249,899 A | 2/1981 | Davis |
| 4,260,076 A | 4/1981 | Bergman |
| 4,265,618 A | 5/1981 | Herskovitz et al. |
| 4,440,324 A | 4/1984 | Lebecque |
| 4,526,300 A | 7/1985 | Woody |
| 4,583,934 A | 4/1986 | Hata et al. |
| 4,688,177 A | 8/1987 | Ripani et al. |
| 4,715,275 A | 12/1987 | Getman |
| 4,747,838 A | 5/1988 | Wolff et al. |

(List continued on next page.)

*Primary Examiner*—Jacob K. Ackun, Jr.
(74) *Attorney, Agent, or Firm*—Blakely, Sokoloff, Taylor & Zafman LLP

(57) ABSTRACT

A system, method and apparatus for dispensing chocolate. Solid chocolate is heated to its melting point within a chamber in order to form a liquid chocolate that is viscous and can flow out an opening in a nozzle at one end when pressure is exerted at another end. The chocolate dispenser is portable and has a housing or case that holds a heating chamber and a heater. The heater heats solid chocolate in the heating chamber into liquid chocolate. A nozzle is snapped or screwed into a dispensing end of the dispenser. A plunger has a piston inserted into the heating chamber to apply pressure to liquid chocolate in order for it to flow out of an opening in the nozzle. A children's playset for use with the chocolate dispenser includes a support structure to support the chocolate dispenser over a dispensing area. One embodiment of the playset includes a turn table and a tapper. A cooling tray may be included in the playset to cool the melted chocolate to its solid form.

115 Claims, 11 Drawing Sheets

U.S. PATENT DOCUMENTS

| | | | |
|---|---|---|---|
| 4,776,490 A | 10/1988 | Wingert | |
| 4,834,635 A | 5/1989 | Groen | |
| 4,844,917 A | 7/1989 | DeLorimiere | |
| D303,612 S | 9/1989 | Knispel | |
| D307,379 S | 4/1990 | Knispel | |
| 4,941,597 A | 7/1990 | Lopez et al. | |
| 4,951,846 A | 8/1990 | Oster et al. | |
| 5,026,187 A | 6/1991 | Belanger et al. | |
| 5,026,194 A | 6/1991 | Lewis | |
| 5,306,192 A | 4/1994 | Caveza et al. | |
| 5,362,164 A | 11/1994 | Wingert | |
| D365,830 S | 1/1996 | Hubbard et al. | |
| 5,614,130 A | 3/1997 | Müller et al. | |
| 5,664,701 A | 9/1997 | Massena | |
| 5,718,356 A | 2/1998 | Nottingham et al. | |
| 5,769,272 A | 6/1998 | Massena | |
| 5,779,103 A | 7/1998 | Massena | |
| 5,820,910 A | 10/1998 | Jury | |
| 5,881,912 A | 3/1999 | Bokros | |
| 5,881,923 A | 3/1999 | Bokros | |
| 5,881,924 A | 3/1999 | Bokros | |
| 5,882,709 A | 3/1999 | Zumbe | |
| 5,895,683 A | 4/1999 | Crook et al. | |
| 5,938,116 A | 8/1999 | Restive et al. | |
| 5,964,377 A | 10/1999 | Demarest et al. | |
| 6,003,733 A | 12/1999 | Wheeler | |
| 6,051,267 A | 4/2000 | Jury et al. | |
| 6,283,656 B1 | 9/2001 | Jiang | |
| 6,319,532 B1 | 11/2001 | Pineault | |
| 6,460,736 B1 * | 10/2002 | D'Agostino | 222/146.5 |

* cited by examiner

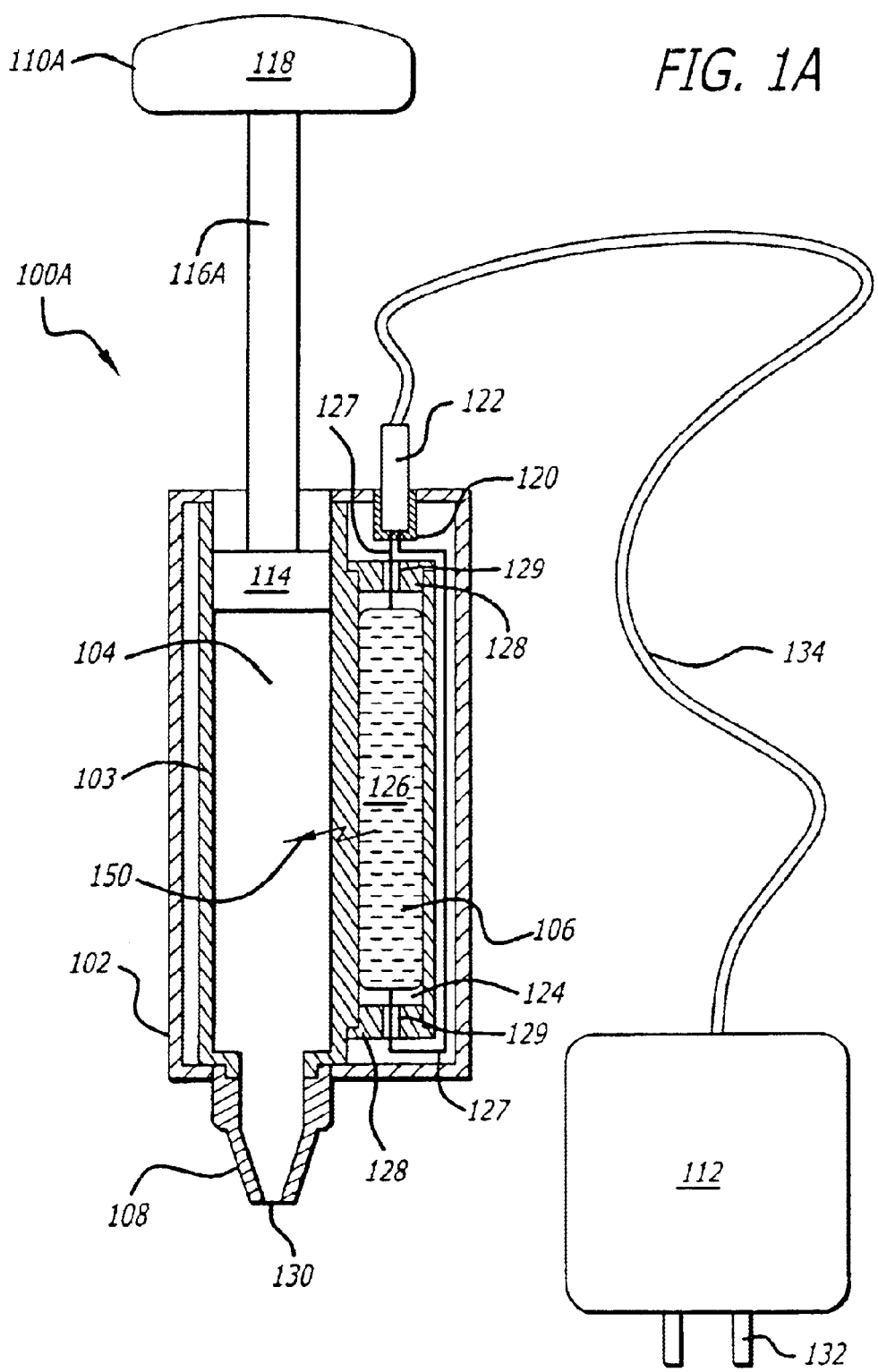

METHODS AND APPARATUS FOR CHOCOLATE DISPENSERS

FIELD OF THE INVENTION

This invention generally relates to dispensing machines and more particularly to liquid food dispensers.

BACKGROUND OF THE INVENTION

Chocolate is a food product which is well known throughout the world. Chocolate is typically produced from the seeds of cacao trees. Various types of chocolate can be formed depending upon how it is mixed. The primary ingredient in chocolates, but for white chocolate, is chocolate liquor which is also referred to as unsweetened, bitter, baking, or cooking chocolate. When mixed with certain percentages of milk solids, sugar, vanilla or vanillin, lecithin, and additional cocoa butter, the combinations form extra-bittersweet, bittersweet, semisweet, sweet cooking, dark and milk chocolates. Milk chocolate contains less chocolate liquor than dark chocolate and has some butterfat and a greater percentage of milk solids. White chocolate contains no chocolate liquor but otherwise resembles the composition of milk chocolate.

The melting temperatures of the various types of chocolates can vary depending upon their composition. If chocolate is overheated it can burn easily. For example, dark chocolate should not be heated to temperatures greater than one hundred twenty degrees Fahrenheit (120 F) while milk and white chocolates should not be heated to temperatures greater than one hundred ten degrees Fahrenheit (110 F). The cooking chocolates can generally handle greater temperatures without burning.

Chocolates are solid at room temperatures. However when chocolate is heated, it can be melted into a molten or liquid state so that it flows as a fluid. If liquid chocolate is cooled back to room temperatures, it can return to a solid state.

Chocolates can be formed into various shapes and sizes when cooled into a solid state. Bars of chocolate, (i.e., chocolate bars), are very well known to be consumed by children and adults alike. Chips of chocolate, (i.e., chocolate chips), come in various sizes and shapes and can be formed out of the various types of chocolates. Oftentimes chocolate chips are formed of semi-sweet chocolate to be used in baking chocolate chip cookies. Cocoa is a pulverized type of chocolate, a powder, which is typically formed out of defatted chocolate liquor without any sugar being added. Supermarkets often carry two types of cocoa, alkalized and nonalkalized. Alkalized cocoa has been processed with alkali to neutralize acidity and raise its pH level. Cocoa powder is not to be confused with instant hot chocolate which contains a large percentage of sugar.

In whatever form, it is oftentimes desirable to dispense chocolate.

BRIEF DESCRIPTIONS OF THE DRAWINGS

FIG. 1A is a cross sectional view of a first embodiment of a chocolate dispenser.

DETAILED DESCRIPTION OF THE PREFERRED EMBODIMENT

Figure 1B:
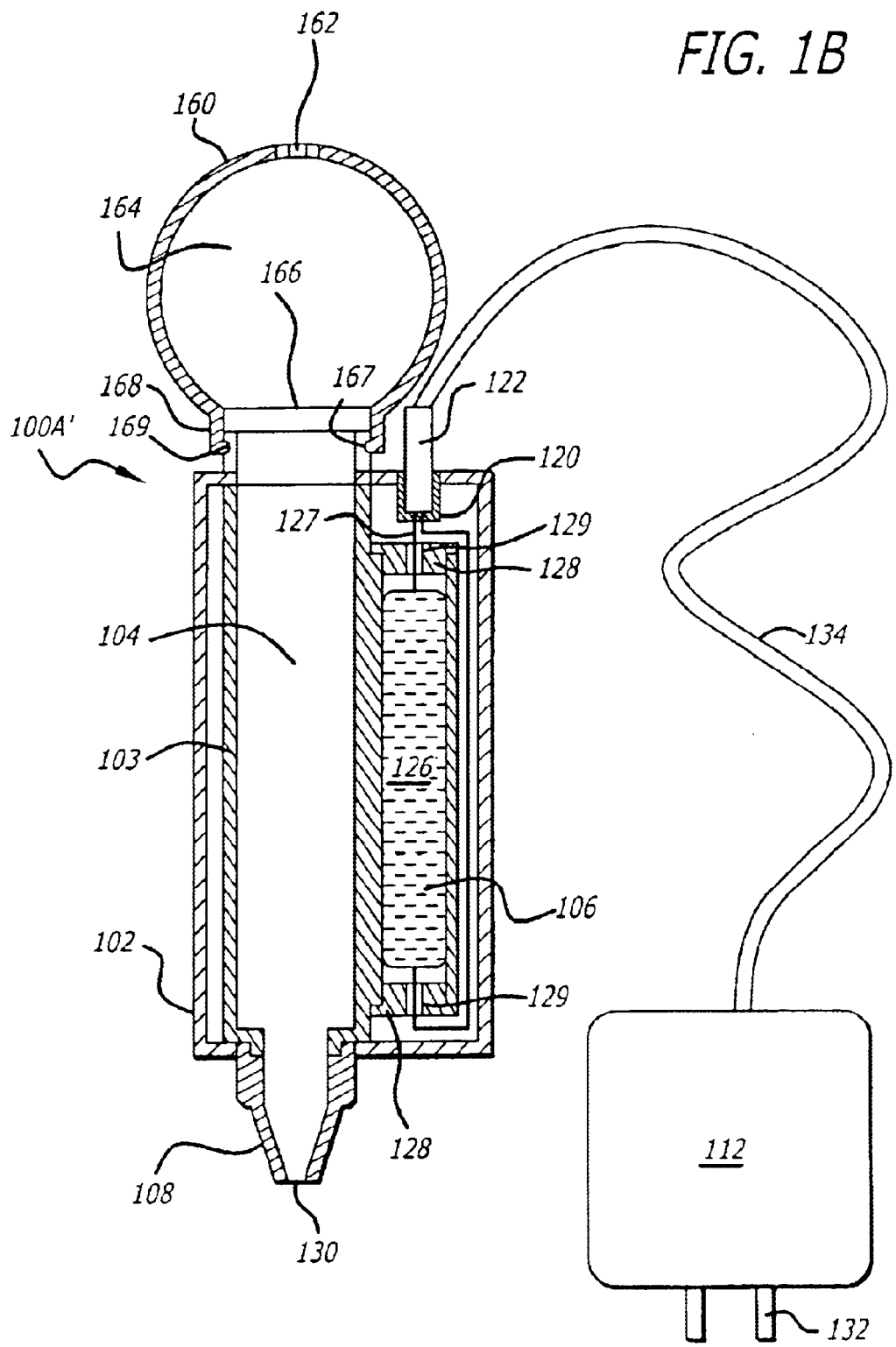
FIG. 1B is a cross sectional view of another embodiment of the chocolate dispenser.

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention.

Briefly, the invention includes a system, method and apparatus for dispensing chocolate. Solid chocolate is heated to its melting point within a chamber in order to form a liquid chocolate that is viscous and can flow out an opening in a nozzle at one end when pressure is exerted at another end. The dispenser can be hand-held and may be alternatively referred to as a chocolate gun, a chocolate syringe, or a chocolate sprayer. The dispenser includes a housing or case that holds a chamber and a heater. A nozzle can be snapped or screwed into a dispensing end of the dispenser. A plunger has a piston shaped similar to the shape of the chamber. This piston can slide up and down the side or wall of the chamber. The piston can apply pressure to liquid chocolate in order for it to flow out of an opening in the nozzle. The piston of the plunger is inserted into the chamber at an end opposite of the dispensing end. The chamber is heated by the electric heater, in order to melt chocolate from its solid state into a liquid state which allows the liquid chocolate to be dispensed.

Referring now to FIG. 1A, a cross sectional view of a first embodiment for a chocolate dispenser is illustrated. The chocolate dispenser 100A includes a case or housing 102, a thermal conductive body 103, a heating tube or chamber 104, a heating element or heater 106, a nozzle 108, a plunger 110A, and a power supply or power converter 112. The plunger 110A includes a piston 114 and a rod 116. The piston 114 can slide up and down the side or wall of the heating chamber 104. If the shape of the chamber 104 provides more than one, the piston 114 can slide up and down the sides or walls of the heating chamber 104. In the embodiment of the chocolate dispenser illustrated in FIG. 1A, the plunger 110A further includes a knob or handle 118 in order to manually exert pressure against melted chocolate in the chamber 104 and dispense it out through the nozzle 108.

The case or housing 102 in a preferred embodiment is formed out of plastic and cylindrically shaped around the thermal conductive body 103. The case or housing 102 is insulated from the thermal conductive body 103 so that it does not become too hot to touch or handle. The heating chamber 104 is formed out of the thermal conductive body 103. In one embodiment, the heating chamber 104 is five-eighths of an inch in diameter. At each end of the housing 102 is an opening into the chamber 104. At the dispensing end of the housing 102, the nozzle 108 can mate with the opening and the chamber 104. At the opposite end of the housing 102, the piston 114 of the plunger 110 can be inserted into the chamber 104 through the opening in the housing 102. The case or housing 102 further includes an electrical connector receptacle 120 to receive an electrical connector plug 122.

The thermal conductive body 103 is a good thermal conducting material into which the heating chamber 104 may be formed. In a preferred embodiment, the thermal conductive body 103 is aluminum and the heating chamber 104 is cylindrically shaped. Alternatively, the thermal conductive body 103 may be formed out of other thermal conductive materials such as copper or brass.

Adjacent to or attached around the heating chamber 104 is the heater 106. The heater 106 is thermally coupled to the heating chamber 104. That is, the heat generated by the heater 106 is conducted through the thermal conductive body 103 and into chocolate within the heating chamber 104. In one embodiment, the thermal conductive body 103 includes a heater cavity 124 along the side of the heating chamber 104. The heater cavity 124 is shaped to accept a heating element 126. With the heating element 126 positioned within the heater cavity 124, a pair of caps 128 can seal each end of the heater cavity. Each of the caps 128 in a preferred embodiment are formed of plastic and have a small opening 129 through which a wire 127 can pass and connect to the heating element 126. Each of the caps 128 may position the heating element 126 and the wires 127 so as to not make an electrical connection to the heater cavity 124 or other conductive object and possibly short out.

In one embodiment, the heating element 126 is an inexpensive resistive heating element. In other embodiments, the heater 106 can be an air heater including a filament such as found in toasters which can be formed along the side of the chamber 104 or can wrap around the chamber 104.

The resistive heating element 126 is powered by a low voltage alternating current (AC) power supply. The low voltage AC power supply is generated by a step down isolation transformer within the power converter 112 from the high voltage power supplied at the plugs 132 when plugged into a wall outlet. In the United States, the high voltage power supplied to the plugs 132 is approximately one hundred and ten AC volts (110 VAC). In one embodiment, the low voltage AC supplied to the resistive heating element 126 is less than eighteen AC volts (18 V AC) for safety reasons. It has been observed that heating the various types of chocolate to one hundred five degrees Fahrenheit (105 F) causes the chocolate to melt. The power required to be supplied to the heater 106 to heat chocolate to 105 degrees F. in 4 minutes is approximately three and one half Watts (3.5 W).

In order to make the case or housing 102 and the thermal conductive body 103 easy to clean under water, a power cable 134 that supplies power to the heater 106 can be made detachable by using the socket or receptacle 120 and the plug 122. In preferred embodiments, the receptacle 120 is a female electrical connector and the plug 122 is a male electrical connector. In the power cable 134 between the plug 122 and the power converter 112, there are at least one pair of conductors or wires. When it is desirable to clean the chocolate dispenser 100, the plug 122 can be pulled out of the receptacle 120 so that the power converter 112 need not get wet.

The nozzle 108 includes an external opening or exit orifice 130 through which liquid chocolate may flow. As previously discussed the nozzle 108 can be a snap-in-nozzle which snaps to the housing 102 or can be screwed into the housing by using threads on the nozzle 108 and housing 102. In this manner, the nozzle 108 can be easily removed and replaced with a different nozzle. That is, the nozzle is interchangeable with other nozzles. Various nozzles can be attached to the heating chamber to change the shape of the exit orifice 130. In one embodiment of the nozzle, the exit orifice 103 is a small opening that allows a user to write, using script or printing for example, using chocolate. In another case, the exit orifice 130 of a nozzle is molded into a decorative shape so that the chocolate is dispensed into the decorative shape. In another case, the exit orifice 130 of a nozzle is a larger opening to allow dispensing a larger volume of liquid chocolate, into a mold for example.

Figure 2A:
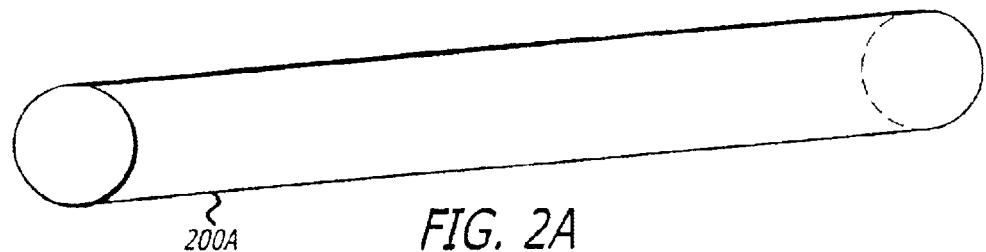
FIG. 2A is a perspective view of a first embodiment of a chocolate cylindrical rod.
Figure 2B:
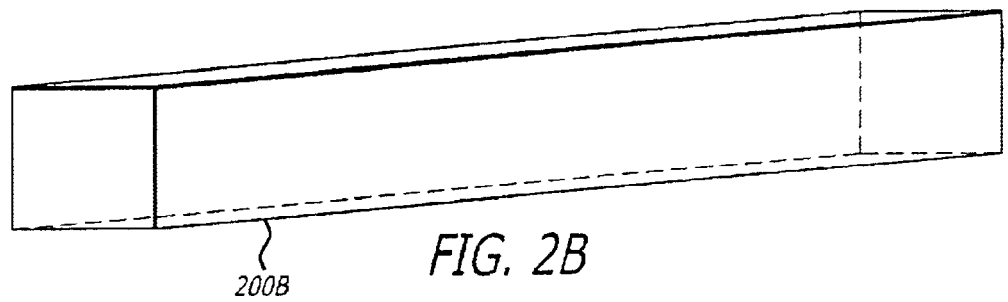
FIG. 2B is a perspective view of another embodiment of the chocolate cylindrical rod.
Figure 2C:
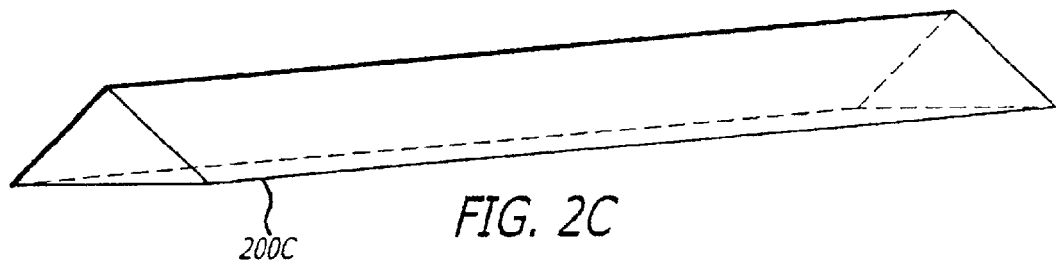
FIG. 2C is a perspective view of another embodiment of the chocolate cylindrical rod.

Referring now to FIGS. 2A–2C, solid chocolate is molded at a chocolate factory into the shape of a cylindrical rod to match the cylindrical shape of the heating chamber 104. The chocolate rods and heating chamber may have various cylindrical shapes, three of which are illustrated in FIGS. 2A–2C. In FIG. 2A, cylindrical chocolate rod 200A is a circular cylindrical shape. In FIG. 2B, cylindrical chocolate rod 200B is a square or rectangular cylindrical shape. In FIG. 2C, cylindrical chocolate rod 200C is a triangular cylindrical shape. Cylindrical chocolate rods 200A, 220B, and 200C are generally referred to as a cylindrical chocolate rod 200 or cylindrical chocolate rods 200.

Figure 3A:
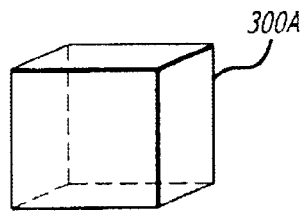
FIG. 3A is a perspective view of a chocolate chunk.
Figure 3B:
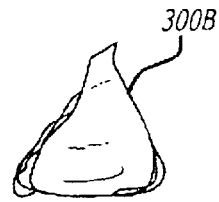
FIG. 3B is a perspective view of a chocolate chip.
Figure 3C:
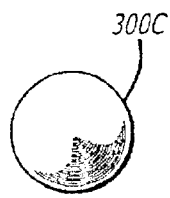
FIG. 3C is a perspective view of a chocolate ball or sphere.

Referring now to FIGS. 3A–3C, various other shapes of solid chocolate are illustrated which can be prepared at a chocolate factory. In FIG. 3A, a chocolate chunk or chocolate cube 300A is illustrated. In FIG. 3B, a chocolate chip or a chocolate kiss 300B is illustrated. In FIG. 3C, a chocolate ball or sphere 300C is illustrated. In other cases, the solid chocolate may be irregularly shaped such as when a user breaks or cuts off chunks from a chocolate bar.

Referring now back to FIG. 1A, with the plunger 110 removed from the chamber 104, the solid chocolate, whether its chunks, chips, spheres, or cylindrical rods, is inserted into the heating tube or chamber 104. Alternatively, liquid chocolate at room temperature can also be poured into the heating tube or chamber 104 and heated to dispense a hot liquid chocolate from the chocolate dispenser 100A. The plunger 110 is replaced so that the piston 114 can apply pressure to the chocolate. The heating element 126 of the heater 106 is powered on through the power converter 112, the cable 134, the plug 122, the socket 120, and the wires 127. The heat from the heating element 126 is thermally coupled to the heating chamber 104 as illustrated by the arrow 150. The solid chocolate is melted into liquid chocolate by the heater 106 heating the chamber.

Typical melting points for chocolate can range between 86 degrees F. to 96 degrees F., lower than the typical body temperature of 98.6 degrees F. Depending upon what's mixed into the chocolate, the melting point may be of a higher temperature. In the preferred embodiment, the solid chocolate is melted into liquid chocolate by the heater 106 heating the chamber and the chocolate up to 105 degrees F. In an alternate embodiment, the heater 106 can heat the chamber over a range of temperatures to melt solid chocolate. In one embodiment, the chocolate dispenser includes a potentiometer, a rheostat, or variable resistor, so that a user can set the desired heating temperature of the chamber to melt solid chocolate. In another embodiment, the chocolate dispenser includes a thermostat to maintain a thermostatic temperature to melt solid chocolate or an adjustable thermostat so that a user can set the desired heating temperature of the chamber to melt solid chocolate.

The liquid or melted chocolate in the chamber can then be dispensed from the chocolate dispenser 100A by applying pressure to the chocolate or by evacuating it. The pressure on the chocolate in the chamber can be provided in a number of ways. One way of mechanically applying pressure to the chocolate is to use the plunger 110 illustrated in FIG. 1A. A force on the plunger 110 causes the piston 114 to apply pressure to the liquid chocolate so that it is dispensed out the orifice or opening 130 in the nozzle 108. Another way to apply pressure to the chocolate in the chamber is to apply gas pressure.

Referring now to FIG. 1B, another embodiment of the chocolate dispenser is illustrated. Chocolate dispenser 100A' includes a squeeze bulb 160 in order to apply air pressure to chocolate in the chamber and extrude it out of the opening 130 in the nozzle 108. The squeeze bulb 160 includes a one-way air valve 162 and an air chamber 164. At the top of the chamber is a cylindrical lip 166 and a cylindrical slot 167. The squeeze bulb 160 includes a cylindrical flange 168 that engages the cylindrical lip 166. The cylindrical flange 168 has a cylindrical seal 169 that engages the cylindrical slot 167 to provide an air tight seal. The squeeze bulb is formed of flexible material such as rubber, plastic, or silicon to allow it to be squeezed and the air in the air chamber 164 forced out into the heating chamber 104.

The one-way air valve 162 operates to allows air flow in one direction only, into the air chamber 164. The one-way air valve 162 closes to keep air from exiting the air chamber 164. In this manner when the squeeze bulb 160 is squeezed, air pressure is applied to the chocolate to force it out of the chamber, into the nozzle and out the opening 130 of the nozzle 108. In an alternate embodiment, a mechanical air pump can be coupled to the end of the chamber 104 such that air pressure can be applied to the liquid chocolate by manual pumping. In another alternate embodiment, a cap with a fitting can be coupled to the end of the chamber forming a gas tight seal. A pressurized gas can be introduced through the fitting to apply gas pressure to the chocolate and force it through the opening 130 of the nozzle 108.

Otherwise, the embodiment of the chocolate dispenser 100A' is somewhat similar to the embodiment of the chocolate dispenser 100A with like elements having the same reference numbers. For brevity, the description of the similar elements is not repeated here.

Figure 1C:
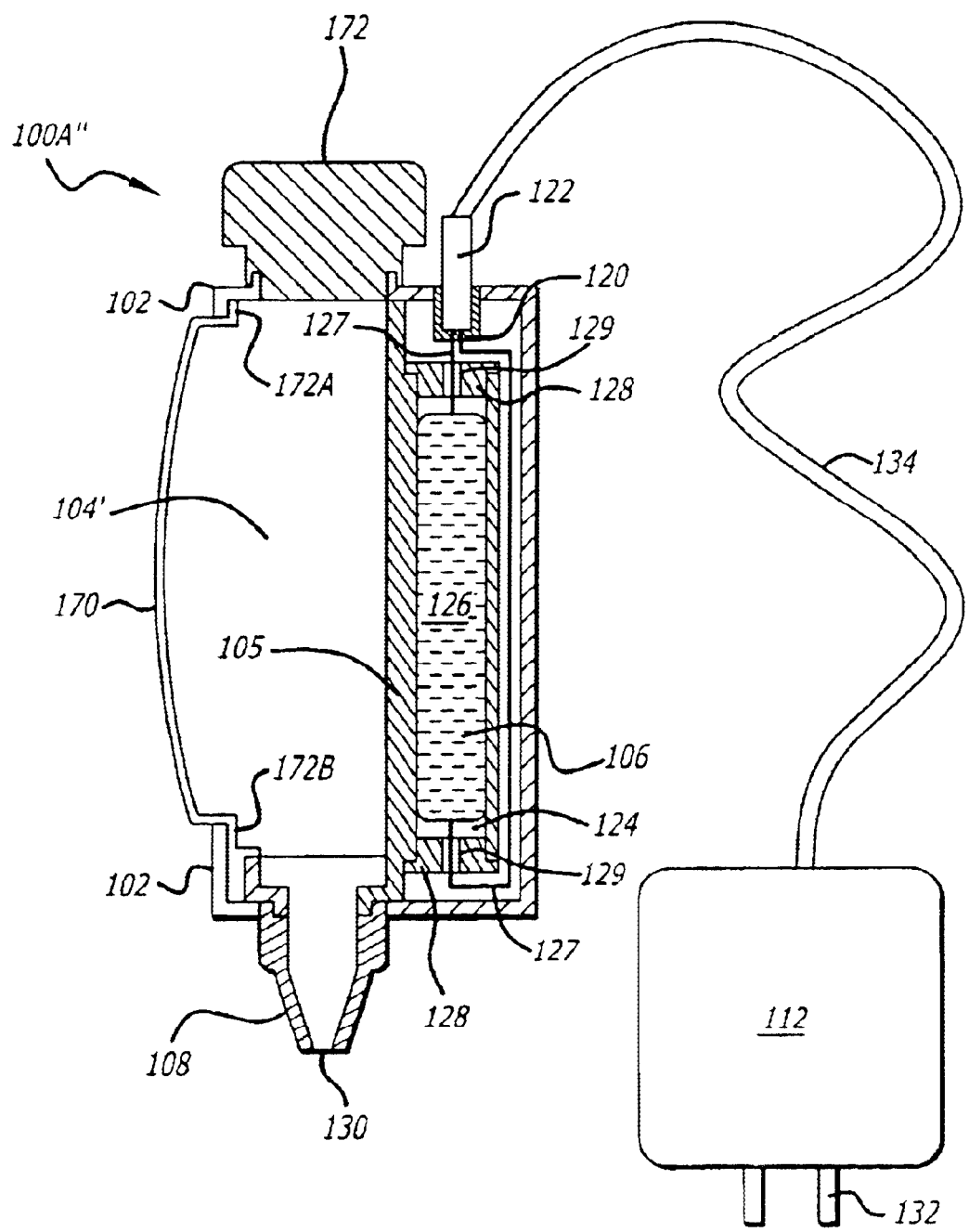
FIG. 1C is a cross sectional view of another embodiment of the chocolate dispenser.

Referring now to FIG. 1C, another embodiment of the chocolate dispenser is illustrated. Chocolate dispenser 100A" includes a flexible bladder 170 and a fill tube cap or stopper 172 in order to apply mechanical pressure to chocolate in the chamber 104' and extrude it out of the opening 130 in the nozzle 108. The flexible bladder 170 includes an upper seal 172A and a lower seal 172B to couple to the case 102 and provide a liquid tight seal. In this embodiment, the flexible bladder 170 and the thermal conductive body 103' form a collapsible heating tube or chamber 104'. A portion of the collapsible heating tube or chamber 104', the flexible bladder 170, is mechanically squeezed to apply pressure and force out the chocolate from the chamber through the opening 130 in the nozzle 108. When decoupled, the fill tube cap or stopper 172 allows chocolate to be inserted into the chamber 104'. When coupled to an end of the chamber 104', the fill tube cap or stopper 172 provides a liquid tight seal to deter chocolate from escaping through that end of the chamber 104'. The flexible bladder 170 is formed of flexible material such as rubber, plastic, or silicon to allow it to be squeezed to press out the chocolate in the heating chamber 104'. The fill tube cap or stopper 172 is formed of plastic in one embodiment. The fill tube cap or stopper 172 can be pressed, snapped onto or screwed onto the end of the heating chamber 104'.

Otherwise, the embodiment of the chocolate dispenser 100A" is somewhat similar to the embodiment of the chocolate dispenser 100A with like elements having the same reference numbers. For brevity, the description of the similar elements is not repeated here.

Referring momentarily back to FIG. 1A, various automatic, semi-automatic and manual mechanism's can be employed to move the plunger 110 further into the heating chamber 104 thereby applying a force and pressure on the piston 114 to dispense the chocolate. In the embodiment of the chocolate dispenser 100A illustrated in FIG. 1A, the plunger 110A includes a knob or handle 118 at an end opposite the piston 114. A user manually applies a force by pushing on the knob or handle 118 in order to apply pressure to the chocolate so that it is dispensed. The plunger 110A may be friction fit so as to require force to dispense the liquid chocolate.

Figure 4:
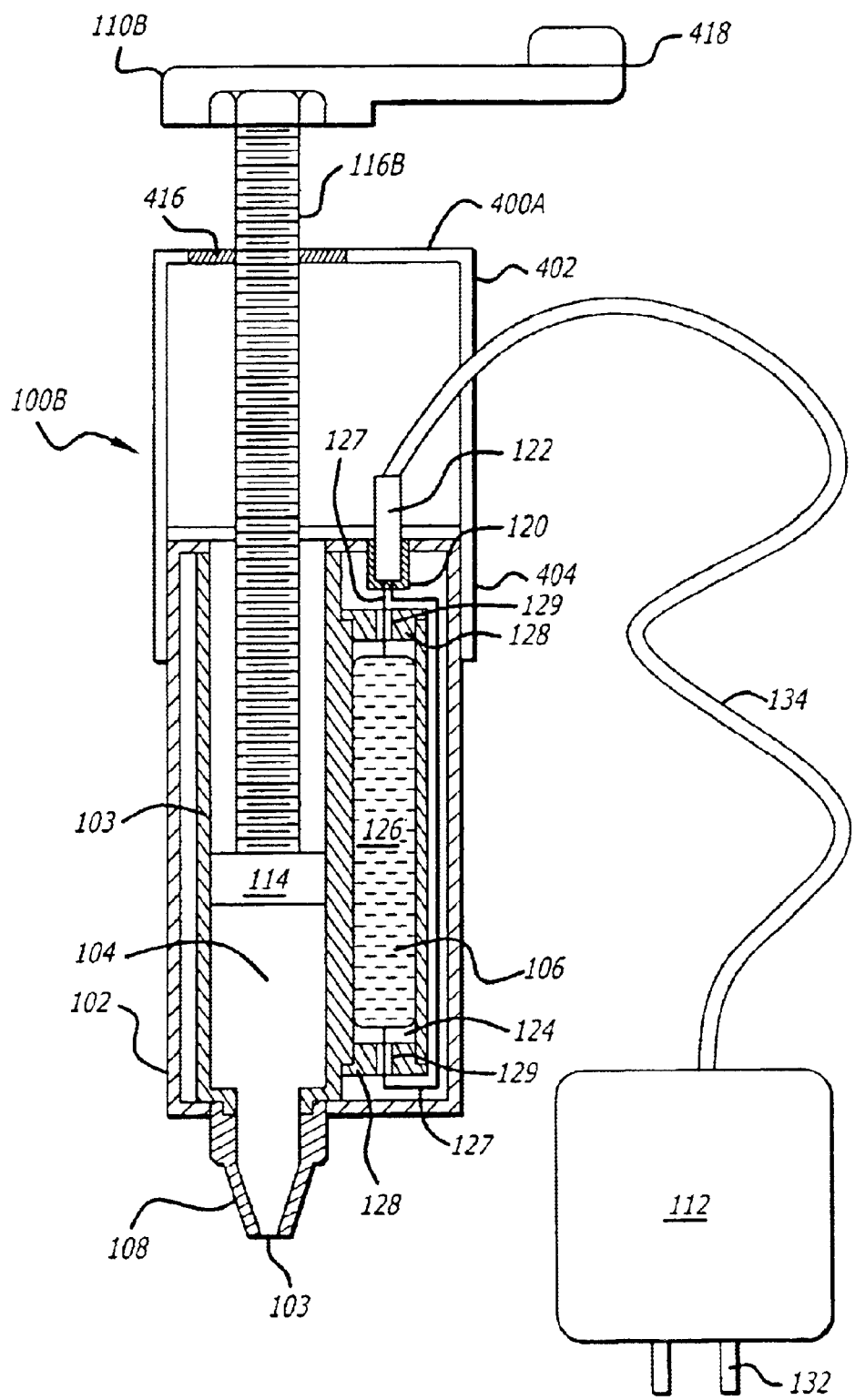
FIG. 4 is a cross sectional view of another embodiment of the chocolate dispenser.

Referring now to FIG. 4, another embodiment of the chocolate dispenser is illustrated. The chocolate dispenser 100B includes a plunger cap 400A which includes a threaded plunger 110B. The threaded plunger 110B includes the threaded rod or shaft 116B having a male screw thread along its outside surface, a hand crank handle 418, and the piston 114. The hand crank handle 418 can also be a knob or other type of handle to allow the threaded rod or shaft 116B to be turned and threaded into the chamber 104. The plunger cap 400A further includes a housing 402 having a skirt 404 that mates with the housing 102, the plug 122, and a threaded shaft guide nut 416 having a female screw thread to thredly engage the male screw thread of the threaded rod 116B. The skirt 404 of the housing 402 may be press fitted together with the housing 102. The piston 114 can rotate and slide up and down the side or wall of the heating chamber 104. Alternatively, the piston 114 may be rotatably attached to the rod such that the rod 116B may only turn and the piston 114 can slide up and down the side or wall of the heating chamber 104.

In this manual embodiment of the chocolate dispenser 100B, the hand crank 418 at the end opposite of the piston 114 is manually turned in order that the threaded rod 116 and piston 114 can be screwed into the chamber 104 and pressure can be applied to liquid chocolate. The threaded engagement between the guide nut 416 and the threaded rod 116B allows the rod and the piston 114 to be screwed into and out of the chamber 104. Otherwise, the embodiment of the chocolate dispenser 100B is somewhat similar to the embodiment of the chocolate dispenser 100A with like elements having the same reference numbers. For brevity, the description of the similar elements is not repeated here.

Figure 5A:
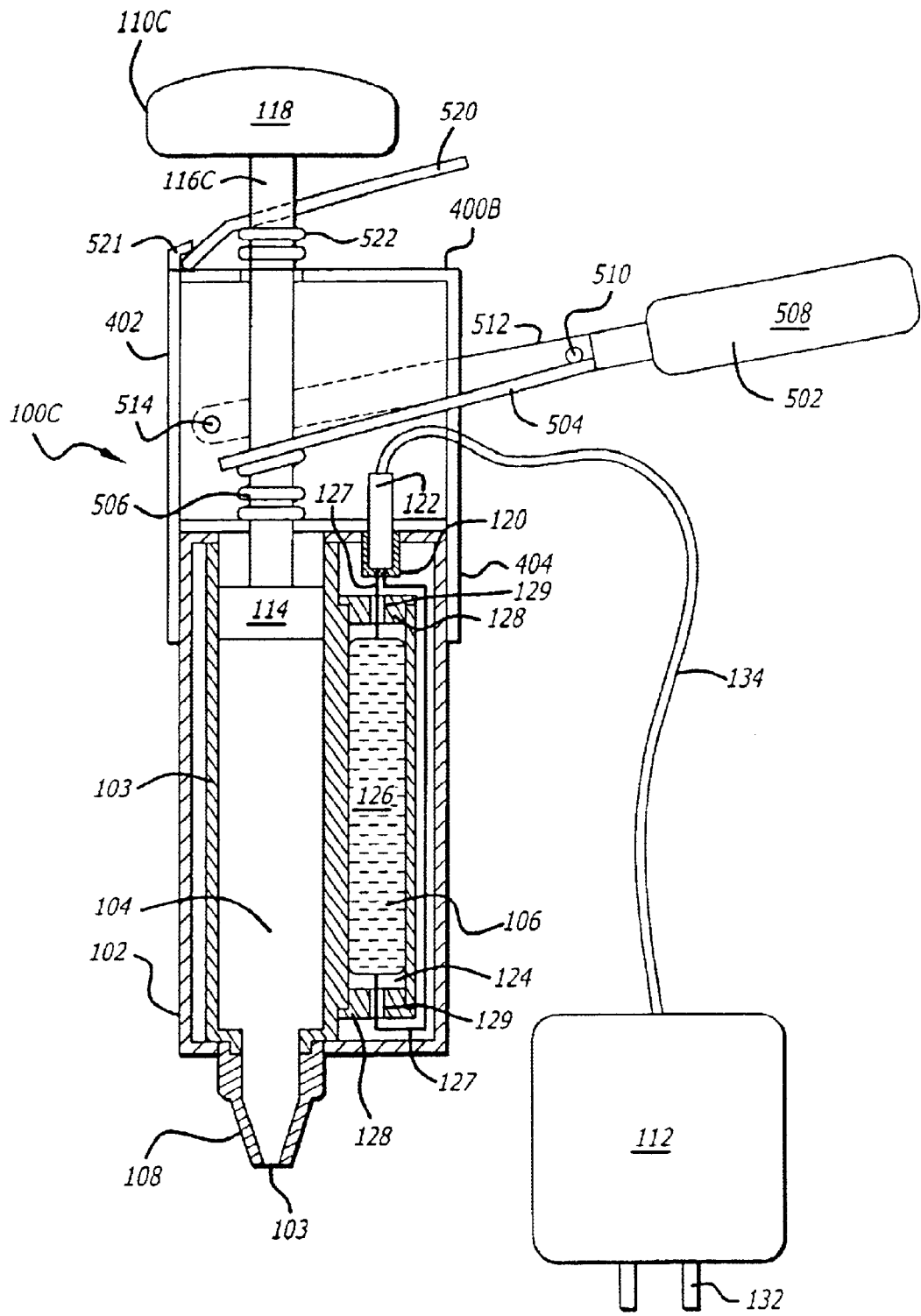
FIG. 5A is a cross sectional view of another embodiment of the chocolate dispenser.

Referring now to FIG. 5A, another embodiment of the chocolate dispenser is illustrated. The chocolate dispenser 100C includes a plunger cap 400B which includes a plunger 110C. The plunger 110C includes the rod or shaft 116C and the piston 114. The plunger 110C may also include the handle 118 at an end opposite the piston 114. Regarding the plunger 110C, the plunger cap 400C further includes a lever actuator 502, an engagement lever 504, and a spring 506 in order to apply force to the rod or shaft 116C and cause the piston 114 to exert pressure on liquid chocolate so that its dispensed out the nozzle 108. The lever actuator 502, when moved up and down, causes the rod and piston of the plunger 110C to apply pressure to the liquid chocolate. The lever actuator 502 includes a handle 508, a first pin 510, a pair of arms 512 that wrap around the housing 402, and a second pin 514. The lever actuator 502 levers or pivots up and down around the second pin 514. The first pin 510 engages the engagement lever 504. The engagement lever 504 includes an opening into which the rod 116C is inserted. The spring 506 surrounds the rod 116C and mates with the lower surface of the engagement lever 504. As the lever actuator 502 is pushed down, the engagement lever 504 compresses the spring 506 and causes the rod 116C to be forced into the chamber 104. When the lever actuator 502 is lifted up, the engagement lever 504 allows the spring 506 to become decompressed and the opening in the engagement lever is allowed to slide up the rod 116C to obtain a different bite. In this manner, the lever actuator 502 can cause liquid chocolate to be dispensed from the chocolate dispenser 100C.

The plunger cap 400C may further include a lock or release lever 520, a keeper 521, and a spring 522 to control the motion of the plunger 11D. One end of the release lever 520 engages the keeper 521 of the plunger cap 400C. The release lever 520 has an opening in which the rod 116C is positioned and further couples adjacent the housing 402 at one end. The spring 522 surrounds the rod 116C and applies force to the release lever 520. The spring force allows the opening in the release lever to bind the rod 116C and hold it in place. Pressing down on the release lever 520 compresses the spring 522, releases the bind the opening has on the rod 116, and allows the plunger 110C to be pulled up into a starting position.

The plunger cap 400B further includes the housing 402 having the skirt 404 that mates with the housing 102 and the plug 122. The plunger cap 400B further has openings at each end to allow the plunger 110C to be moved. The skirt 404 of the housing 402 may be press fitted together with the housing 102. Otherwise, the embodiment of the chocolate dispenser 100C is somewhat similar to the embodiment of the chocolate dispenser 100A with like elements having the same reference numbers. For brevity, the description of the similar elements is not repeated here.

Figure 5B:
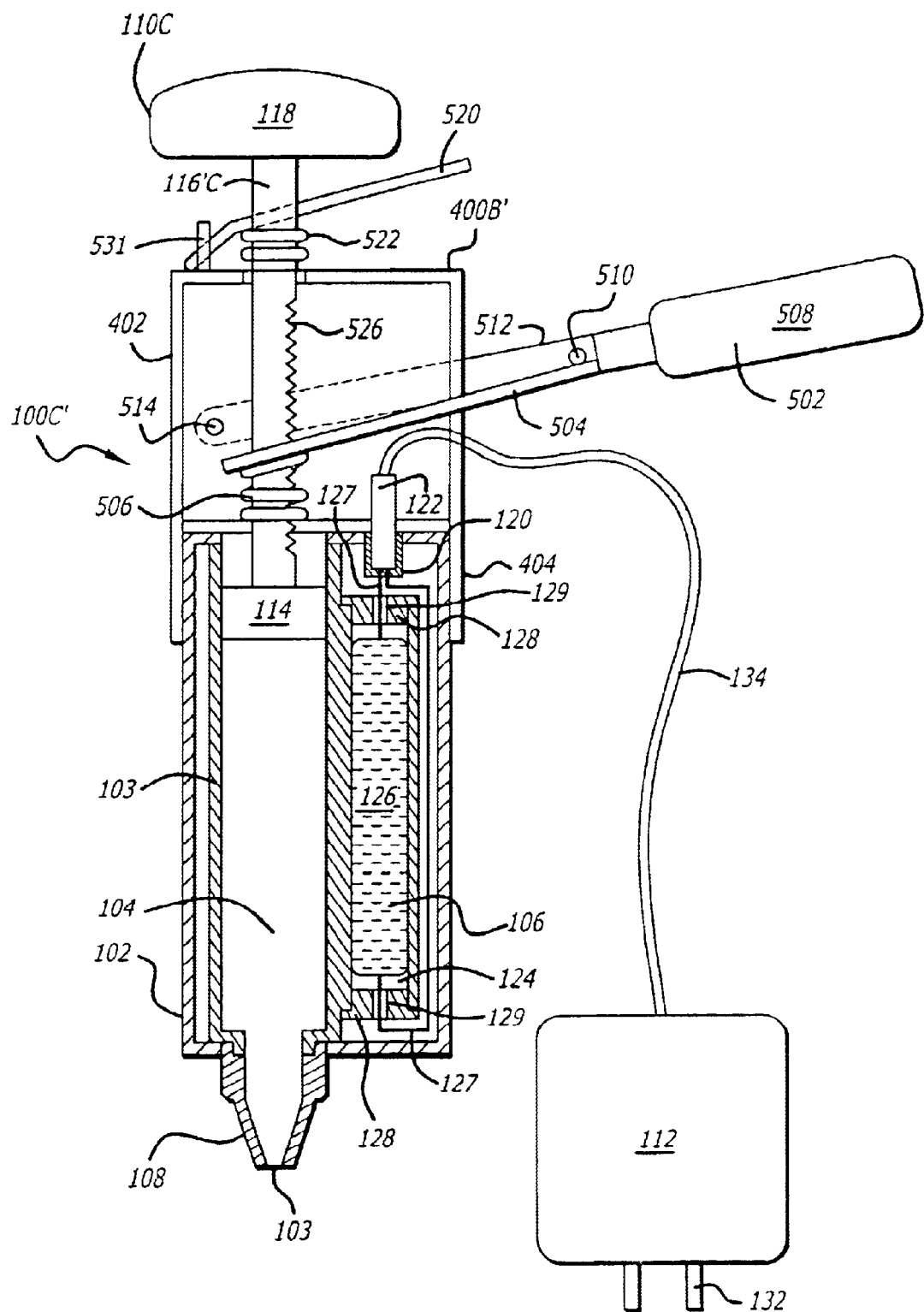
FIG. 5B is a cross sectional view of another embodiment of the chocolate dispenser.

Referring now to FIG. 5B, another embodiment of a chocolate dispenser 100C' is illustrated which has slight modifications from that of the chocolate dispenser 100C. In this embodiment of the chocolate dispenser 100C', the rod 116C' includes a rack 526 along an edge of its outside surface and the engagement lever 504 may engage the rack 526 such that the rod is ratcheted into the chamber 104. In which case, the lever actuator 502 may also be referred to as a ratchet. Additionally, the plunger cap 400B' has a fastener 531 to engage an end of the release lever 520 to the housing 402 as illustrated. Otherwise, the embodiment of the chocolate dispenser 100C' is similar to the embodiment of the chocolate dispenser 100C with like elements having the same reference numbers. For brevity, the description of the similar elements is not repeated here.

Figure 6:
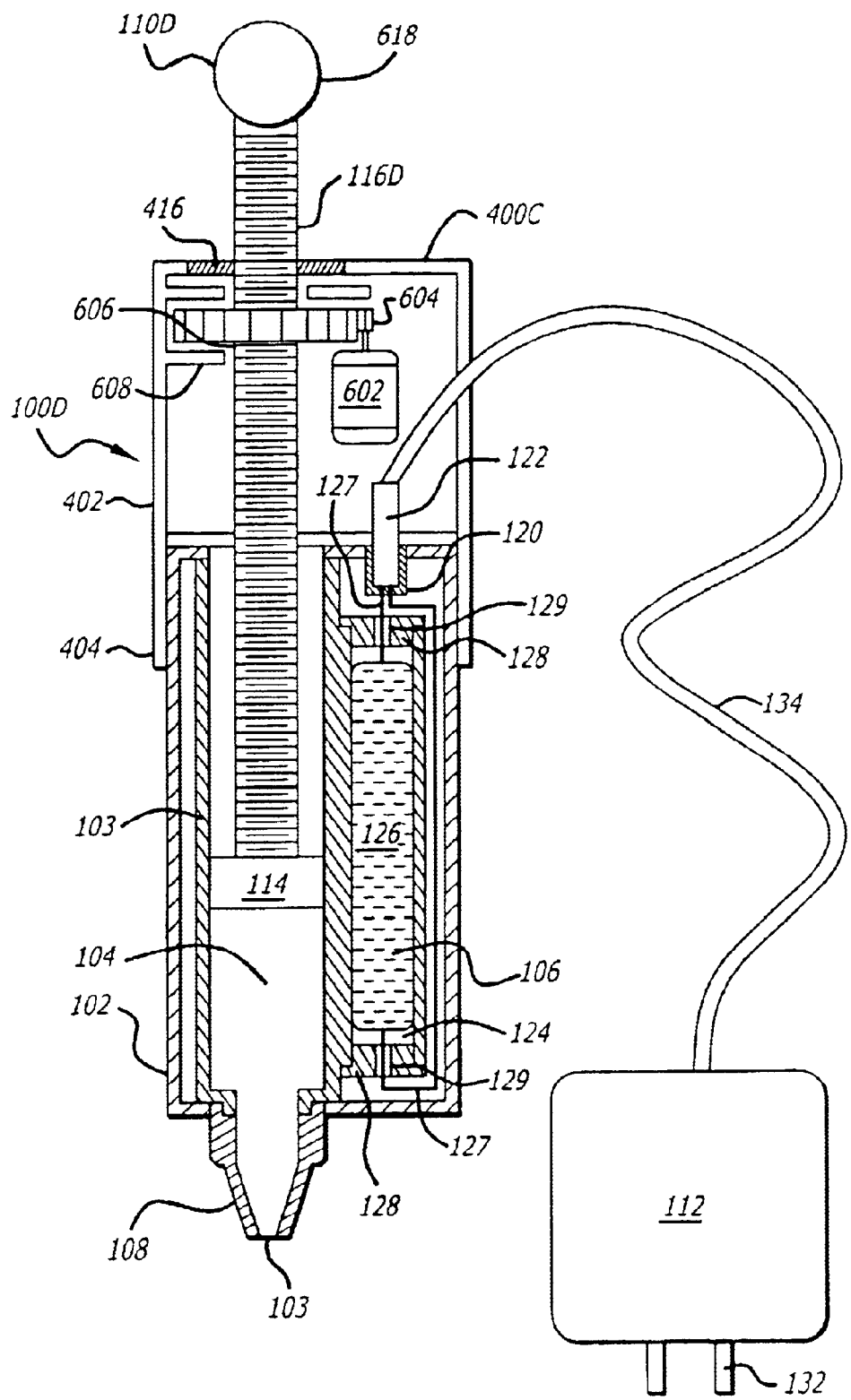
FIG. 6 is a cross sectional view of another embodiment of the chocolate dispenser.

Referring now to FIG. 6, another embodiment of the chocolate dispenser is illustrated. The chocolate dispenser 100D includes a plunger cap 400C which includes a threaded plunger 110D. The threaded plunger 110D includes the threaded rod or shaft 116D having a male screw thread along its outside surface, a thread stop 618 (such as a knob or bolt head), and the piston 114. Regarding the threaded plunger 110D, the plunger cap 400C further includes a motor 602, a pinion gear 604, a drive gear 606, and a gear retainer 608. The plunger cap 400C further includes the housing 402 having the skirt 404 that mates with the housing 102, as the plug 122, and the threaded shaft guide nut 416 having female screw threads to threadly engage the male screw thread of the threaded rod or shaft 116B. The skirt 404 of the housing 402 may be press fitted together with the housing 102.

In this automated embodiment of the chocolate dispenser, the electric motor 602 can be turned ON and OFF by a trigger switch (not shown) integrated into the housing 102. When turned ON, the motor 602 through the gears 604 and 606 can rotate or turn the threaded rod or shaft 116D and thread it into the chamber 104 thereby having the piston 114 apply pressure to the liquid chocolate. The gear retainer 608 retains the drive gear 606 in place to keep it engaged with the pinion gear 604. Otherwise, the embodiment of the chocolate dispenser 100D is somewhat similar to the embodiment of the chocolate dispensers 100A and 100B with like elements having the same reference numbers. For brevity, the description of the similar elements is not repeated here.

The chocolate dispensers 100A, 100A', 100A", 100B, 110C, and 100D can be generally referred to herein as chocolate dispensers 100. The chocolate dispensers 100 are readily portable from one place to another and can be hand held when in use. The chocolate dispensers 100 can be used to decorate cakes or other confections using chocolate. The chocolate dispensers 100 can be hand held and used for free form writing of chocolate onto different objects with the appropriate nozzle 108. The chocolate dispensers 100 can additionally be used to inject liquid chocolate into negative cavity molds to form shaped chocolate objects. In any case after the liquid chocolate is dispensed, it can be cooled in a refrigerator or an ice tray, or otherwise allowed to cool at room temperature so that the liquid chocolate returns to a solid state. The chocolate dispensers 100 may be used by children as toys. The chocolate dispensers 100 may also be used in commercial settings by bakers, cooks, chefs, etc. where a portable or hand-held chocolate dispenser is desirable.

Figure 7:
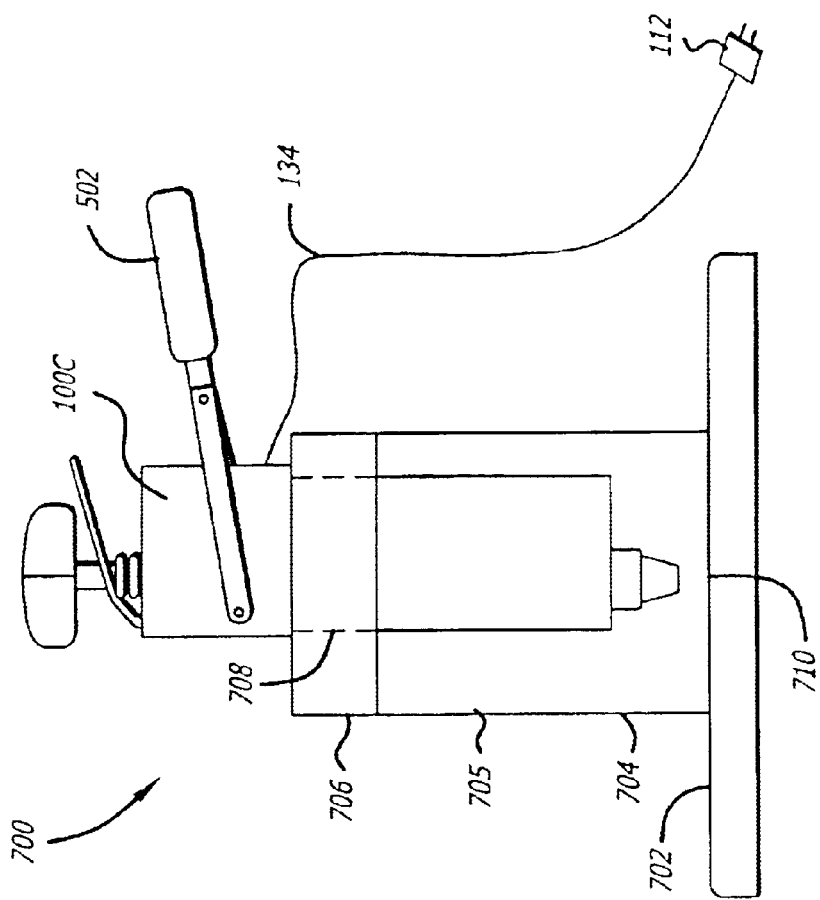
FIG. 7 is a side view of a first embodiment of a chocolate dispensing system including a chocolate dispenser.

Referring now to FIG. 7, a first embodiment of a chocolate dispensing system is illustrated. The chocolate dispensing system 700 includes a base 702, a support structure 704, and a chocolate dispenser 100, such as chocolate dispenser 100C including its lever actuator 502. The support structure 704 includes a back 705 and a head 706. The head 706 of the support structure 704 includes an opening 708 to allow the lower portion of the chocolate dispenser to slide through. The upper portion of the chocolate dispenser does not slide through and thus, the chocolate dispenser 100 is supported by the support structure 704. The support structure also withstands the forces applied to the level actuator 502 to dispense the liquid chocolate. The support structure may be coupled to the base 702. The positioning of the chocolate dispenser 100 in the support structure 704 forms a dispensing area 710 on the base 702 where liquid chocolate may be dispensed. Cakes, donuts, cookies, or other confections or foods may be placed in the dispensing area 710 so that liquid chocolate can be dispensed onto them. Alternatively, a mold having a cavity can be placed in the dispensing area in order to fill the cavity with liquid chocolate so that it solidifies into the shape of the cavity. One or more molds with one or more cavities may be formed into a mold tray for ease of handling in filing one or more molds.

Figure 8A:
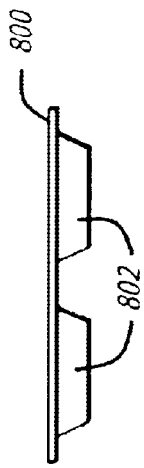
FIG. 8A is a side view of a mold tray.
Figure 8B:
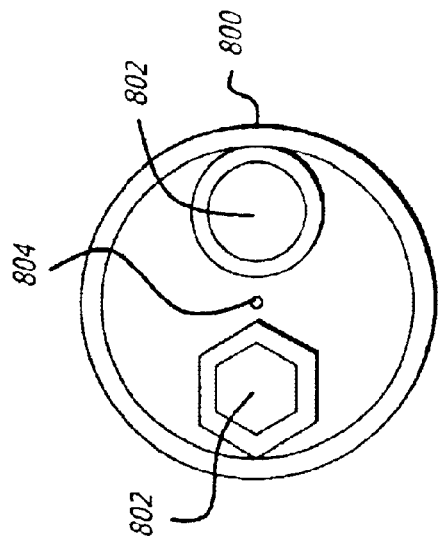
FIG. 8B is a top view of the mold tray of FIG. 8A.

Referring now to FIG. 8A, a side view of a mold tray 800 is illustrated. FIG. 8B is a top view of the mold tray 800 of FIG. 8A. The mold tray 800 includes one or more cavities 802. The one or more cavities 802 of the mold tray are typically vacuum formed cavities. In one embodiment, the one or more cavities 802 are placed nearer the edge of the mold tray 800 and include a center hole 804 as is illustrated in FIG. 8B. The shape of the one or more cavities 802 can be any object such as animals, characters, or geometric shapes. In one embodiment, the one or more cavities 802 are three-dimensionally shaped to form solid three dimensional chocolate objects. After the liquid chocolate has cooled into its solid state, a solidified chocolate object can be ejected from the one or more cavities of the mold tray 800 by simply pressing on the back side of the thin walled cavity.

Figure 9:
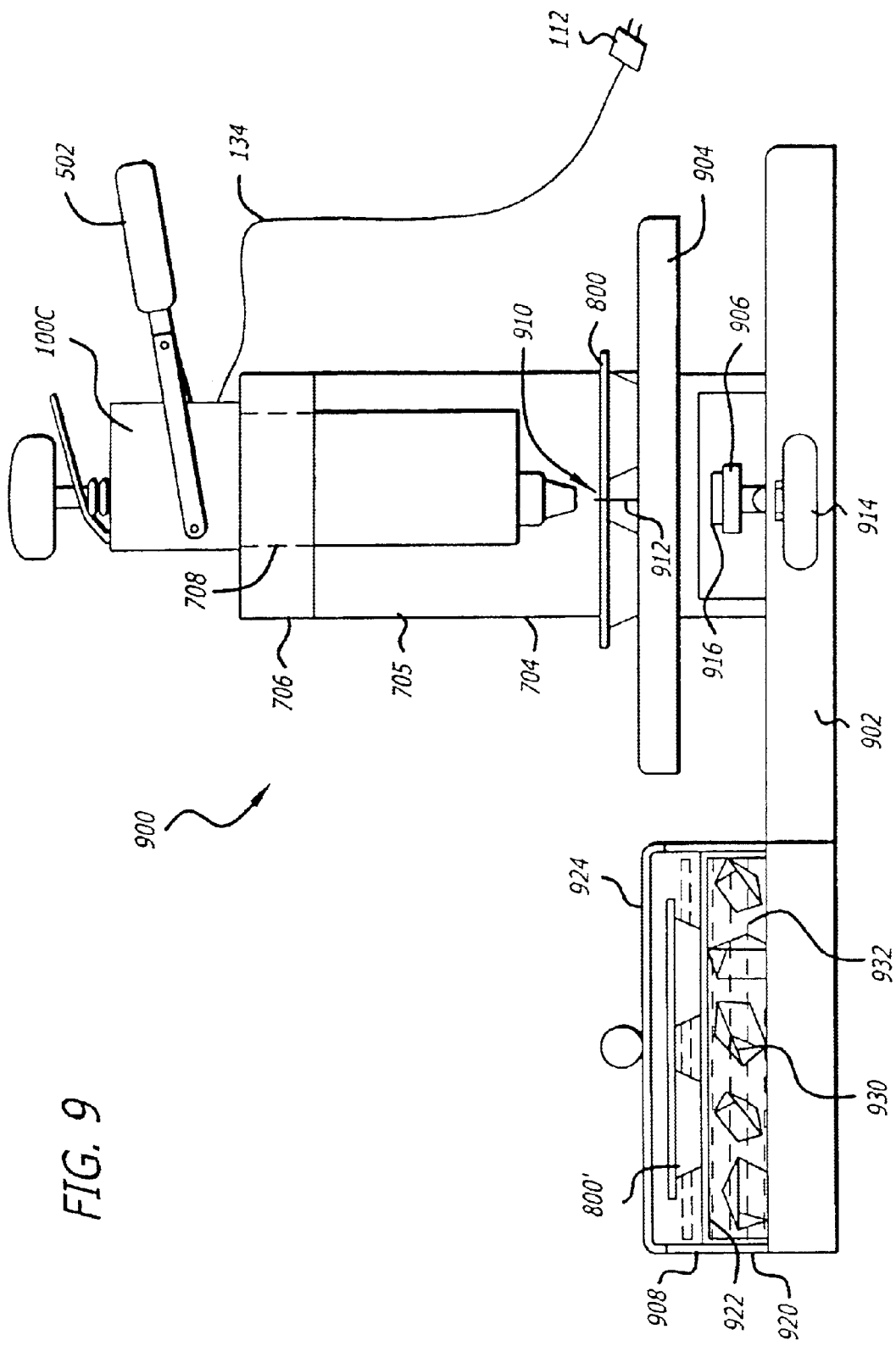
FIG. 9 is a side view of another embodiment of a chocolate dispensing system including a chocolate dispenser.

Referring now to FIG. 9 a second embodiment of a chocolate dispensing system is illustrated. The chocolate dispensing system 900 includes a base 902, a turn-table 904, a tapping mechanism 906, a cooling tray 908, the support structure 704, and the chocolate dispenser 100, such as chocolate dispenser 100C including its lever actuator 502.

The support structure 704 includes a back 705 and a head 706. The head 706 of the support structure 704 includes an opening 708 to allow the lower portion of the chocolate dispenser to slide through. The upper portion of the chocolate dispenser does not slide through and thus, the chocolate dispenser 100 is supported by the support structure 704. The support structure also withstands the forces applied to the level actuator 502 to dispense the liquid chocolate. The support structure 704 may be coupled to the base 902. The positioning of the chocolate dispenser 100 in the support structure 704 forms a dispensing area 910 over the base 902 where liquid chocolate may be dispensed. Cakes, donuts, cookies, or other confections or foods may be placed on the turn table 904 and rotated into the dispensing area 910 so that liquid chocolate can be dispensed onto them. Alternatively, the mold tray 800 is placed on the turn table 904 and the one or more cavities 802 are rotated into the dispensing area 910 to receive liquid chocolate. The center hole 804 of the mold tray 800 can be aligned with a center post 912 of the turn table 904 so that the one or more cavities 802 can easily be positioned into the dispensing area 910. The turn table 904 can spin on a center pivot point so that the one or more cavities 802 of the mold tray 800 or other objects can be turned into the dispensing area 910 to receive liquid chocolate.

Liquid chocolate can flow and be dispensed from the chocolate dispenser when the solid chocolate is melted or molten. However, liquid chocolate has a high surface tension and does not flow well unless under pressure. In order to evenly settle the liquid chocolate into a mold cavity, vibrations can be applied to the liquid chocolate so that the surface tension is broken and the liquid chocolate can evenly settle. The tapping mechanism 906 can be used to provide vibrations in order for the liquid chocolate to evenly settle into a mold cavity.

The tapping mechanism 906 includes a tapper button 914 at the end of a lever arm and a tapper disk 916. When the tapper button 914 is pushed, the tapper disk 916 can rise up and strike a bottom portion of the turn table 904. In a preferred embodiment, the tapper disks strikes the bottom portion of the turn table 904 near the dispensing area 910. When the bottom portion of the turn table 904 is hit by the tapper disk 916, vibrations are sent through the turntable into the mold tray 800 and the liquid chocolate within the cavity. The vibrations caused by the tapping mechanism 906 eases the surface tension and allows the liquid chocolate to settle more evenly into a mold cavity. As a result, additional liquid chocolate can be dispensed into the mold cavity so that a more even solid chocolate molded object can be formed. In an alternate embodiment, the turn table 904 can have openings which allows the tapper disk 916 to directly contact the outside of the mold cavity in order to more directly cause vibrations to make the chocolate settle.

Once the liquid chocolate has been dispensed into the mold cavities of the mold tray 800, the liquid chocolate can be cooled. One means of more quickly cooling the liquid chocolate into solid chocolate is to use the cooling tray 908. As illustrated, the one or more cavities of the mold tray 800' are filled with liquid chocolate. The cooling tray 908 includes a tub 920, a platform 922, and a lid 924. The tub 920 is preferably leak resistant to hold a liquid coolant such as water. The platform includes a number of openings so that the level of the liquid coolant can rise above the level of the platform 922 in the tub 920. The mold tray 800' is placed inside the cooling tray 908 so that it rests on the platform. Ice cubes 930 and water 932 can be placed in the tub and used as the coolant to cool the liquid chocolate in the mold tray 800' into solid chocolate. As illustrated in FIG. 9, the water level can rise above the level of the platform 922 so that the water 932 can make contact with the base of the mold tray 800'. After the chocolate cools to a solid state, it can be pressed out of the mold tray 800' by pushing on the outside of the mold cavity or by lightly tapping it. In the chocolate dispensing system 900, the cooling tray 908 can be placed on the base 902 and may be integrated therewith. That is, the chocolate dispensing system 900 includes a chocolate dispensing station with an integrated cooling station.

Figure 10:
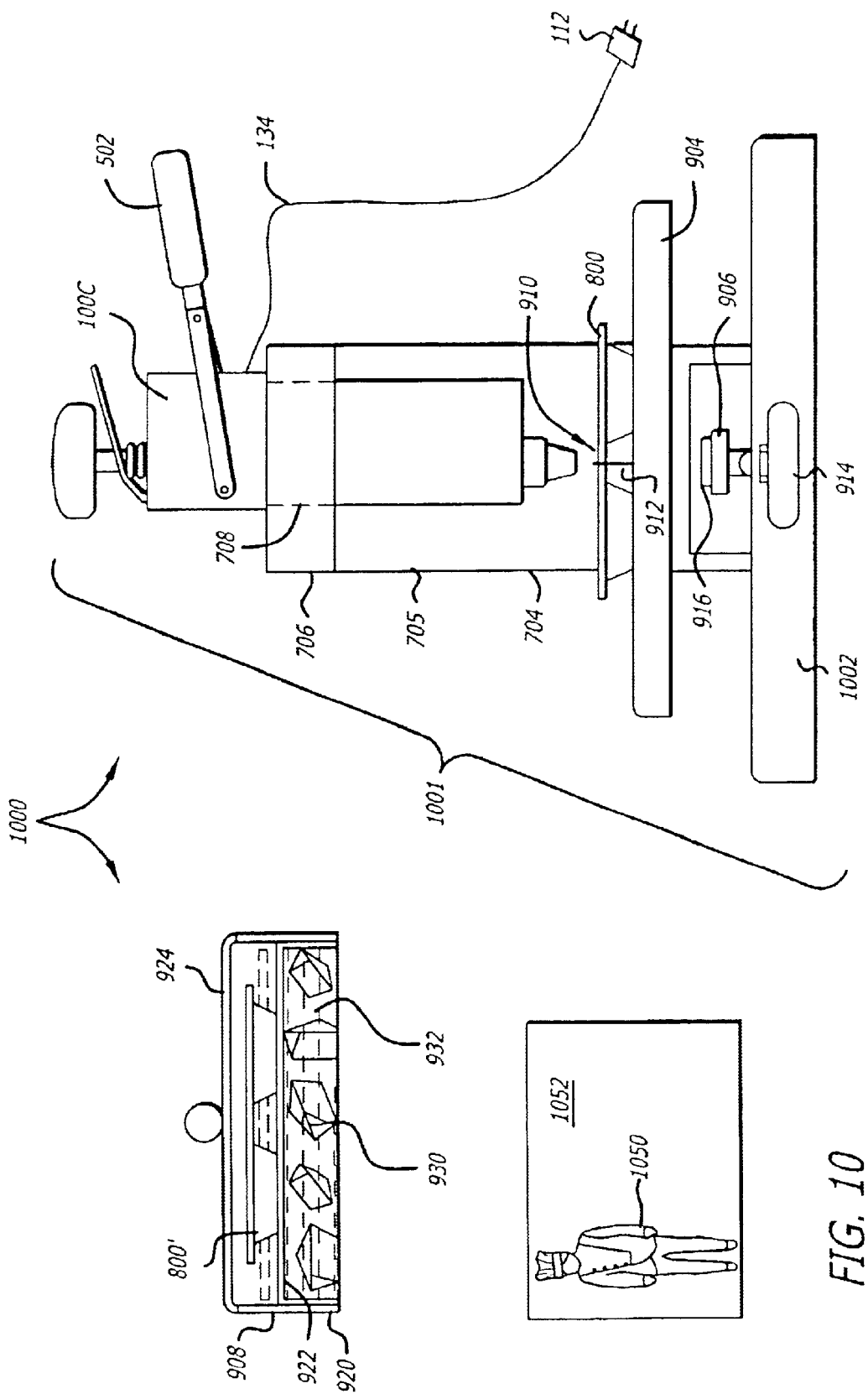
FIG. 10 is a side view of another embodiment of a chocolate dispensing system including a chocolate dispenser.

Referring now to FIG. 10, a third embodiment of a chocolate dispensing system is illustrated. The chocolate dispensing system 1000 includes a chocolate dispensing station 1001 with a separate cooling tray 908 or cooling station. The chocolate dispensing station 1001 includes a base 1002, the turn-table 904, the tapping mechanism 906, the support structure 704, and the chocolate dispenser 100, such as chocolate dispenser 100C including its lever actuator 502. But for the base 1002 and the cooling tray 908 being separate, the chocolate dispensing system 1000 is similar to the chocolate dispensing system 900 with like elements having the same reference numbers. For brevity, the description of the similar elements is not repeated here.

The chocolate dispensing systems may be commercially used by bakers, cooks, candy makers, or other food workers. The chocolate dispensing systems may also be used by children as playsets. The playsets of the chocolate dispensing system may include toy characters 1050, such as a baker, cook, chef, candy maker, or other foodworker, and one or more background displays 1052 to depict a bakery, kitchen, candy store or other theme for children.

The preferred embodiments of the invention are thus described. While the invention has been described in particular embodiments, the invention should not be construed as limited by such embodiments. For example, certain embodiments have been described as being used by children in playsets but can also be used commercially in a confectionery business, such as for cake decorating as a portable chocolate dispenser. Thus, the invention should be construed according to the claims that follow below.

What is claimed is:

1. A portable chocolate dispenser comprising:
   a chamber having a first end and a second end, the chamber to receive chocolate at the first end;
   a low wattage heater adjacent the chamber to heat chocolate, the low wattage heater to heat the chamber to melt solid chocolate without burning;
   a nozzle adjacent the second end of the chamber, the nozzle having an opening to allow chocolate to exit the portable chocolate dispenser; and,
   a manual plunger to manually apply pressure to chocolate and force it from the second end of the chamber through the opening in the nozzle, the manual plunger includes a handle at a first end of a smooth rod and a piston at a second end of the smooth rod opposite the first end, the piston to be inserted into the first end of the chamber and the handle to manually apply pressure to chocolate.

2. A portable chocolate dispenser comprising:
   a chamber having a first end and a second end, the chamber to receive chocolate at the first end;
   a heater adjacent the chamber to heat chocolate;
   a nozzle adjacent the second end of the chamber, the nozzle having an opening to allow chocolate to exit the portable chocolate dispenser; and,
   a squeeze bulb to apply pressure to chocolate to force it from the second end of the chamber through the opening in the nozzle, the squeeze bulb having a one-way air valve, the squeeze bulb coupled to the first end of the chamber to apply pressure to chocolate.

3. A portable chocolate dispenser comprising:
   a chamber having a first end and a second end, the chamber to receive chocolate at the first end;
   a heater adjacent the chamber to heat chocolate;
   a nozzle adjacent the second end of the chamber, the nozzle having an opening to allow chocolate to exit the portable chocolate dispenser; and,
   a flexible bladder to apply pressure to chocolate to force it from the second end of the chamber through the opening in the nozzle, the chamber having the flexible bladder and a fill tube cap, the fill tube cap to couple to the first end of the chamber.

4. The portable chocolate dispenser of claim 1 wherein the chamber is dimensioned to receive chocolate through the first end.

5. The portable chocolate dispenser of claim 1 further comprising:
   solid chocolate received at the first end of the chamber, the heater to heat the solid chocolate into liquid chocolate, and the plunger to apply pressure to force the liquid chocolate from the second end of the chamber and through the opening in the nozzle.

6. The portable chocolate dispenser of claim 1 wherein the low wattage heater to heat the chamber up to a temperature of one hundred and five degrees Fahrenheit above a melting point of solid chocolate.

7. The portable chocolate dispenser of claim 1 wherein the low wattage heater to heat the chamber over a temperature range of eighty six to one hundred and twenty degrees Fahrenheit at or above a melting point of solid chocolate.

8. The portable chocolate dispenser of claim 2 wherein the low wattage heater to heat the chamber over a temperature range of eighty six to one hundred and twenty degrees Fahrenheit at or above a melting point of solid chocolate.

9. The portable chocolate dispenser of claim 1 further comprising:
   a chocolate rod in its solid state received by the chamber.

10. The portable chocolate dispenser of claim 1 further comprising:
    a chocolate chip in its solid state received by the chamber.

11. The portable chocolate dispenser of claim 1 further comprising:
    a chocolate ball in its solid state received by the chamber.

12. The portable chocolate dispenser of claim 1 further comprising:
    a chocolate powder in its solid state received by the chamber.

13. A portable chocolate dispenser comprising:
    a fixed heating chamber coupled to a housing, the fixed heating chamber having a first end and a second end, the fixed heating chamber to receive chocolate at the first end;
    a low wattage heater adjacent the fixed heating chamber to heat chocolate;
    a nozzle adjacent the second end of the fixed heating chamber, the nozzle having an opening to allow chocolate to exit the portable chocolate dispenser;
    a plunger having a piston, the piston of the plunger to be inserted into the first end of the fixed heating chamber to apply pressure to chocolate, the plunger including a rack along an edge of the rod; and
    a ratchet to engage the rack of the plunger to apply pressure to dispense liquid chocolate from the fixed heating chamber.

14. A portable chocolate dispenser comprising:
    a chamber having a first end and a second end, the chamber to receive chocolate at the first end;
    a heater adjacent the chamber to heat chocolate;
    a nozzle adjacent the second end of the chamber, the nozzle having an opening to allow chocolate to exit the portable chocolate dispenser;
    a plunger having a piston, the piston of the plunger to be inserted into the first end of the chamber to apply pressure to chocolate, the plunger including a male thread along an outer surface of the rod and a handle at an end of the plunger;
    a female thread adjacent the end of the chamber to engage the male thread of the plunger;
    the handle to rotate the plunger to apply pressure to dispense liquid chocolate from the chamber.

15. The portable chocolate dispenser of claim 14 wherein the handle is a hand crank handle.

16. The portable chocolate dispenser of claim 14 wherein the handle is a rotatable handle or knob.

17. A portable chocolate dispenser comprising:
    a chamber having a first end and a second end, the chamber to receive chocolate at the first end;
    a heater adjacent the chamber to heat chocolate;
    a nozzle adjacent the second end of the chamber, the nozzle having an opening to allow chocolate to exit the portable chocolate dispenser;
    a plunger having a piston, the piston of the plunger to be inserted into the first end of the chamber to apply pressure to chocolate, the plunger including a male thread along an outer surface of the rod and a first gear near an end;

a female thread adjacent the end of the chamber to threadly engage the male thread of the plunger; and a motor having a second gear to engage the first gear and to rotate the plunger to thread it into the chamber and apply pressure to dispense liquid chocolate.

18. The portable chocolate dispenser of claim 1 wherein the piston of the plunger slideningly engages a wall of the chamber.

19. A method of extruding chocolate comprising:

placing chocolate into a chamber;

heating the chamber with a low watt electric heater to melt the chocolate therein into liquid chocolate without burning; and directly applying a force to an end of a manual plunger to manually dispense a portion of the liquid chocolate in the chamber through an opening in a nozzle.

20. The method of claim 19 wherein the low watt electric heater to heat the chamber to a temperature of substantially one-hundred and five degrees Fahrenheit above a melting point of solid chocolate.

21. The method of claim 19 wherein the melting point of solid chocolate is a temperature in a range from eighty six to ninety six degrees Fahrenheit, and the low watt electric heater to heat the chamber to a temperature in a range from eighty six to one-hundred and twenty degrees Fahrenheit.

22. A method of extruding chocolate comprising:

placing chocolate into a chamber;

heating the chamber with a low watt electric heater to melt the chocolate therein into liquid chocolate without burning; and applying gas pressure to the liquid chocolate in the chamber to dispense a portion of the liquid chocolate in the chamber through an opening in a nozzle.

23. The method of claim 22 wherein the gas pressure is applied to the liquid chocolate in the chamber by a squeeze bulb.

24. A method of extruding chocolate comprising:

placing chocolate into a chamber;

heating the chamber with a low watt electric heater to melt the chocolate therein into liquid chocolate without burning; and manually applying mechanical pressure to the liquid chocolate in the chamber by squeezing a flexible bladder to dispense a portion of the liquid chocolate in the chamber through an opening in a nozzle.

25. The method of claim 19 wherein the manual plunger has a piston.

26. A method of dispensing chocolate comprising:

providing a portable chocolate dispenser including a heat chamber, a low wattage heater, a nozzle, and a direct manual means to apply pressure;

positioning the portable chocolate dispenser in a support structure of a dispensing station over a dispensing area;

placing chocolate into the heat chamber;

closing the heat chamber;

heating the heat chamber with the low wattage heater to a temperature slightly above a melting point of solid chocolate to melt the chocolate into liquid chocolate without burning; and directly applying pressure to the liquid chocolate using the direct manual means to apply pressure to force a portion of the liquid chocolate out through the nozzle of the portable chocolate dispenser over the dispensing area.

27. The method of claim 26 wherein the melting point of solid chocolate is a temperature in a range from eighty six to ninety six degrees Fahrenheit.

28. The method of claim 26 wherein the direct manual means to apply pressure is a plunger having a piston, and the closing of the chamber is inserting the piston of the plunger into the heat chamber.

29. The method of claim 26 wherein the direct manual means to apply pressure is a squeeze bulb having a one-way air valve, and the closing of the chamber is coupling the squeeze bulb to an end of the heat chamber.

30. The method of claim 26 wherein the direct manual means to apply pressure is a flexible bladder, the heat chamber including the flexible bladder, and the closing of the chamber is coupling a fill cap to an end of the heat chamber.

31. A portable chocolate dispenser comprising:

a heating chamber to receive solid chocolate at a first end and allow liquid chocolate to exit a second end;

a low wattage heater thermally coupled to the heating chamber, the low wattage heater to heat the heating chamber to a temperature above a melting point of solid chocolate to melt solid chocolate into liquid chocolate without burning;

a nozzle coupled to the second end of the heating chamber to receive liquid chocolate, the nozzle having an orifice to dispense liquid chocolate;

a plunger having a piston at a first end of a smooth rod, the piston of the plunger to be inserted into the first end of the heating chamber to apply pressure to liquid chocolate in the heating chamber;

a first housing to hold the heating chamber, the heater, and the nozzle coupled together; and a second housing coupled to the first housing, the second housing slideningly coupled to the plunger to align the piston of the plunger with the heating chamber.

32. The portable chocolate dispenser of claim 31 wherein the low wattage heater to heat the heating chamber to a temperature of substantially one-hundred and five degrees Fahrenheit.

33. The portable chocolate dispenser of claim 31 wherein the melting point of solid chocolate is a temperature in a range from eighty six to ninety six degrees Fahrenheit, and the low wattage heater to heat the heating chamber to a temperature in a range from eighty-seven to one-hundred and twenty degrees Fahrenheit.

34. The portable chocolate dispenser of claim 31 wherein, the orifice of the nozzle is small to write using liquid chocolate.

35. The portable chocolate dispenser of claim 31 wherein, the orifice of the nozzle is shaped to dispense liquid chocolate into a decorative pattern.

36. The portable chocolate dispenser of claim 31 wherein, the orifice of the nozzle is of sufficient size to quickly dispense liquid chocolate into a mold.

37. The portable chocolate dispenser of claim 31 wherein the plunger includes a handle at a second end of the smooth rod to manually apply pressure to liquid chocolate in the heating chamber.

38. The portable chocolate dispenser of claim 31 further comprising:
a lever actuator to engage the smooth rod of the plunger and to apply pressure to liquid chocolate in the heating chamber.

39. The portable chocolate dispenser of claim 38 further comprising:
a releasable lock lever to engage the smooth rod of the plunger and to resist movement of the plunger.

40. The portable chocolate dispenser of claim 39, wherein the second housing to engage an end of the releasable lock lever and an end of the lever actuator.

41. A chocolate dispenser for use by children as a toy, the chocolate dispenser comprising:
a case including
a chamber having a first end and a second end, the chamber to receive chocolate,
a low wattage heater adjacent the chamber to heat solid chocolate of a solid state into liquid chocolate of a liquid state without burning, and,
a nozzle adjacent the first end of the chamber, the nozzle having an opening to dispense liquid chocolate; and,
a manual plunger having a handle at a first end of a smooth rod and a piston at a second end of the smooth rod opposite the first end, the piston of the manual plunger to be inserted into the second end of the chamber, the handle to manually apply pressure to liquid chocolate and dispense it from the chamber through the opening in the nozzle.

42. A portable chocolate dispenser comprising:
a heating chamber to receive solid chocolate at a first end and allow liquid chocolate to exit a second end;
a heater thermally coupled to the heating chamber, the heater to heat the heating chamber to a temperature to melt solid chocolate into liquid chocolate;
a nozzle coupled to the second end of the heating chamber to receive liquid chocolate, the nozzle having an orifice to dispense liquid chocolate; and
a squeeze bulb having a one-way air valve, the squeeze bulb coupled to the first end of the heating chamber to apply pressure to liquid chocolate in the heating chamber.

43. The portable chocolate dispenser of claim 42 wherein the squeeze bulb has a seal to engage a slot near the first end of the heating chamber to form a gas tight seal.

44. The portable chocolate dispenser of claim 42 wherein the portable chocolate dispenser is a toy chocolate dispenser for use by children.

45. The portable chocolate dispenser of claim 42 wherein the portable chocolate dispenser is a portable commercial chocolate dispenser for use by bakers.

46. The portable chocolate dispenser of claim 42 wherein the heater is a low wattage heater to heat the heating chamber to a temperature above a melting point of solid chocolate.

47. The portable chocolate dispenser of claim 46 wherein the melting point of solid chocolate is a temperature range from eighty six to ninety six degrees Fahrenheit.

48. The portable chocolate dispenser of claim 42 further comprising:
a housing to hold the heating chamber, the heater, and the nozzle coupled together.

49. A portable chocolate dispenser comprising:
a collapsible heating chamber to receive solid chocolate at a first end and allow liquid chocolate to exit a second end, the collapsible heating chamber including
a flexible bladder on a side of the collapsible heating chamber, the flexible bladder to apply pressure to liquid chocolate in the collapsible heating chamber;
a heater thermally coupled to the collapsible heating chamber, the heater to heat the collapsible heating chamber to a temperature to melt solid chocolate into liquid chocolate;
a nozzle coupled to the second end of the collapsible heating chamber to receive liquid chocolate, the nozzle having an orifice to dispense liquid chocolate; and
a stopper to couple to the first end of the collapsible heating chamber.

50. The portable chocolate dispenser of claim 49 wherein the flexible bladder has a top seal and a bottom seal to engage a housing of the portable chocolate dispenser.

51. The portable chocolate dispenser of claim 49 wherein the heater is a low wattage heater to heat the collapsible heating chamber to a temperature above a melting point of solid chocolate.

52. The portable chocolate dispenser of claim 51 wherein the melting point of solid chocolate is a temperature range from eighty six to ninety six degrees Fahrenheit.

53. The portable chocolate dispenser of claim 49 further comprising:
a housing to hold the collapsible heating chamber, the heater, and the nozzle coupled together.

54. A playset for children comprising:
a toy chocolate dispenser including
a heating chamber to receive solid chocolate, and
a heater thermally coupled to the heating chamber to melt solid chocolate into liquid chocolate; and
a dispensing station to support and hold the toy chocolate dispenser over a dispensing area of the dispensing station to dispense liquid chocolate therein.

55. The playset of claim 54 wherein
the heater to heat the heating chamber to a temperature above a melting point of solid chocolate.

56. The playset of claim 55 wherein
the melting point of solid chocolate is a temperature range from eighty six to ninety six degrees Fahrenheit.

57. The playset of claim 54 wherein,
the dispensing station includes
a base having the dispensing area where liquid chocolate is to be dispensed by the toy chocolate dispenser.

58. The playset of claim 57 wherein,
the dispensing station further includes
a support structure coupled to the base to support the toy chocolate dispenser, the support structure having an opening to receive the toy chocolate dispenser and point it towards the dispensing area.

59. The playset of claim 54 wherein,
the dispensing station includes
a turntable to rotate an object to the dispensing area, and
a base to rotatably support the turntable.

60. The playset of claim 59 wherein,
the dispensing station further includes
a tapper to tap the turntable to settle liquid chocolate in a mold.

61. The playset of claim 59 wherein,
the dispensing station further includes
a mold tray to rest on the turntable to receive liquid chocolate in the dispensing area, the mold tray having one or more mold cavities, and
a tapper to tap the turntable to settle liquid chocolate in the one or more mold cavities of the mold tray.

62. The playset of claim 59 wherein,
the dispensing station further includes
a support structure coupled to the base to support the toy chocolate dispenser, the support structure having an opening to receive the toy chocolate dispenser and point it towards the dispensing area.

63. The playset of claim 54 wherein,
the toy chocolate dispenser further includes
a nozzle to receive liquid chocolate from the heating chamber and to dispense liquid chocolate, and
a plunger having a piston inserted into the heating chamber to apply pressure to liquid chocolate.

64. The playset of claim 54 further comprising:
a toy character; and
a toy background.

65. The playset of claim 54 wherein,
the toy character is a baker, and
the toy background is a scene of a bakery.

66. The playset of claim 54 further comprising:
a cooling tray to cool liquid chocolate in a mold into solid chocolate.

67. The playset of claim 54 wherein
the toy chocolate dispenser has a first housing and a second housing, the first housing of the toy chocolate dispenser to be inserted into an opening in the dispensing station with the second housing to rest on the dispensing station to support the toy chocolate dispenser.

68. A chocolate dispensing station comprising:
a portable chocolate dispenser including
a heating chamber to receive solid chocolate, and
a heater thermally coupled to the heating chamber to melt solid chocolate into liquid chocolate; and
a support structure to hold the portable chocolate dispenser to dispense liquid chocolate in a dispensing area.

69. The chocolate dispensing station of claim 68 wherein
the heater to heat the heating chamber to a temperature above a melting point of solid chocolate.

70. The chocolate dispensing station of claim 69 wherein
the melting point of solid chocolate is a temperature range from eighty six to ninety six degrees Fahrenheit.

71. The chocolate dispensing station of claim 68 further comprising:
a cooling tray to cool liquid chocolate in a mold into solid chocolate.

72. The chocolate dispensing station of claim 68 further comprising:
a turntable to rotate an object to the dispensing area; and
a base to rotatably support the turntable.

73. The chocolate dispensing station of claim 72 further comprising:
a tapper to tap the turntable to settle liquid chocolate.

74. The chocolate dispensing station of claim 72 further comprising:
a mold tray to rest on the turntable to receive liquid chocolate in the dispensing area, the mold tray having one or more mold cavities, and
a tapper to tap the turntable to settle liquid chocolate in the one or more mold cavities of the mold tray.

75. The chocolate dispensing station of claim 68 wherein,
the portable chocolate dispenser further includes
a nozzle to receive liquid chocolate from the heating chamber and to dispense liquid chocolate, and
a plunger having a piston inserted into the heating chamber to apply pressure to liquid chocolate.

76. The portable chocolate dispenser of claim 1, further comprising:
a potentiometer to set a temperature of the chamber to melt a selected type of solid chocolate.

77. The portable chocolate dispenser of claim 1, further comprising:
a thermostat to maintain a thermostatic temperature of the chamber to melt solid chocolate.

78. The portable chocolate dispenser of claim 1, further comprising:
an adjustable thermostat to maintain a selected thermostatic temperature of the chamber to melt a selected type of solid chocolate.

79. The portable chocolate dispenser of claim 2, further comprising:
a potentiometer to set a temperature of the chamber to melt a selected type of solid chocolate.

80. The portable chocolate dispenser of claim 2, further comprising:
a thermostat to maintain a thermostatic temperature of the chamber to melt solid chocolate.

81. The portable chocolate dispenser of claim 2, further comprising:
an adjustable thermostat to maintain a selected thermostatic temperature of the chamber to melt a selected type of solid chocolate.

82. The portable chocolate dispenser of claim 3, further comprising:
a potentiometer to set a temperature of the chamber to melt a selected type of solid chocolate.

83. The portable chocolate dispenser of claim 3, further comprising:
a thermostat to maintain a thermostatic temperature of the chamber to melt solid chocolate.

84. The portable chocolate dispenser of claim 3, further comprising:
an adjustable thermostat to maintain a selected thermostatic temperature of the chamber to melt a selected type of solid chocolate.

85. The portable chocolate dispenser of claim 13, further comprising:
a potentiometer to set a temperature of the chamber to melt a selected type of solid chocolate.

86. The portable chocolate dispenser of claim 13, further comprising:
a thermostat to maintain a thermostatic temperature of the chamber to melt solid chocolate.

87. The portable chocolate dispenser of claim 13, further comprising:
an adjustable thermostat to maintain a selected thermostatic temperature of the chamber to melt a selected type of solid chocolate.

88. The portable chocolate dispenser of claim 14, further comprising:
a potentiometer to set a temperature of the chamber to melt a selected type of solid chocolate.

89. The portable chocolate dispenser of claim 14, further comprising:

a thermostat to maintain a thermostatic temperature of the chamber to melt solid chocolate.

90. The portable chocolate dispenser of claim 14, further comprising:

an adjustable thermostat to maintain a selected thermostatic temperature of the chamber to melt a selected type of solid chocolate.

91. The chocolate dispenser of claim 41, further comprising:

a potentiometer to set a temperature of the chamber to melt a selected type of solid chocolate.

92. The chocolate dispenser of claim 41, further comprising:

a thermostat to maintain a thermostatic temperature of the chamber to melt solid chocolate.

93. The chocolate dispenser of claim 41, further comprising:

an adjustable thermostat to maintain a selected thermostatic temperature of the chamber to melt a selected type of solid chocolate.

94. The portable chocolate dispenser of claim 1, wherein the low wattage heater is rated at five watts or less.

95. The portable chocolate dispenser of claim 13, wherein the low wattage heater is rated at five watts or less.

96. The method of claim 19, wherein the low watt electric heater is rated at five watts or less.

97. The method of claim 19 wherein
the low watt electric heater to heat the chamber to a temperature at or above a melting point of solid chocolate.

98. The method of claim 97 wherein
the melting point of solid chocolate is a temperature in a range from eighty six to ninety six degrees Fahrenheit.

99. The method of claim 19 wherein
the low watt electric heater to heat the chamber to a temperature in a range of eighty-six to one-hundred and twenty degrees Fahrenheit.

100. The method of claim 22, wherein
the low watt electric heater is rated at five watts or less.

101. The method of claim 22, wherein
the low watt electric heater to heat the chamber to a temperature at or above a melting point of solid chocolate.

102. The method of claim 101, wherein
the melting point of solid chocolate is a temperature in a range from eighty six to ninety six degrees Fahrenheit.

103. The method of claim 22, wherein
the low watt electric heater to heat the chamber to a temperature in a range of eighty-six to one-hundred and twenty degrees Fahrenheit.

104. The method of claim 24, wherein
the low watt electric heater is rated at five watts or less.

105. The method of claim 24, wherein
the low watt electric heater to heat the chamber to a temperature at or above a melting point of solid chocolate.

106. The method of claim 105, wherein
the melting point of solid chocolate is a temperature in a range from eighty six to ninety six degrees Fahrenheit.

107. The method of claim 24, wherein
the low watt electric heater to heat the chamber to a temperature in a range of eighty-six to one-hundred and twenty degrees Fahrenheit.

108. The method of claim 26, wherein
the low watt electric heater is rated at five watts or less.

109. The method of claim 26, wherein
the low watt electric heater to heat the chamber to a temperature at or above a melting point of solid chocolate.

110. The method of claim 109, wherein
the melting point of solid chocolate is a temperature in a range from eighty six to ninety six degrees Fahrenheit.

111. The method of claim 26, wherein
the low watt electric heater to heat the chamber to a temperature in a range of eighty-six to one-hundred and twenty degrees Fahrenheit.

112. The portable chocolate dispenser of claim 31, wherein
the low wattage heater is rated at five watts or less.

113. The chocolate dispenser of claim 41, wherein
the low wattage heater is rated at five watts or less.

114. The portable chocolate dispenser of claim 46, wherein
the low wattage heater is rated at five watts or less.

115. The portable chocolate dispenser of claim 51, wherein
the low wattage heater is rated at five watts or less.

* * * * *